Figure 1:
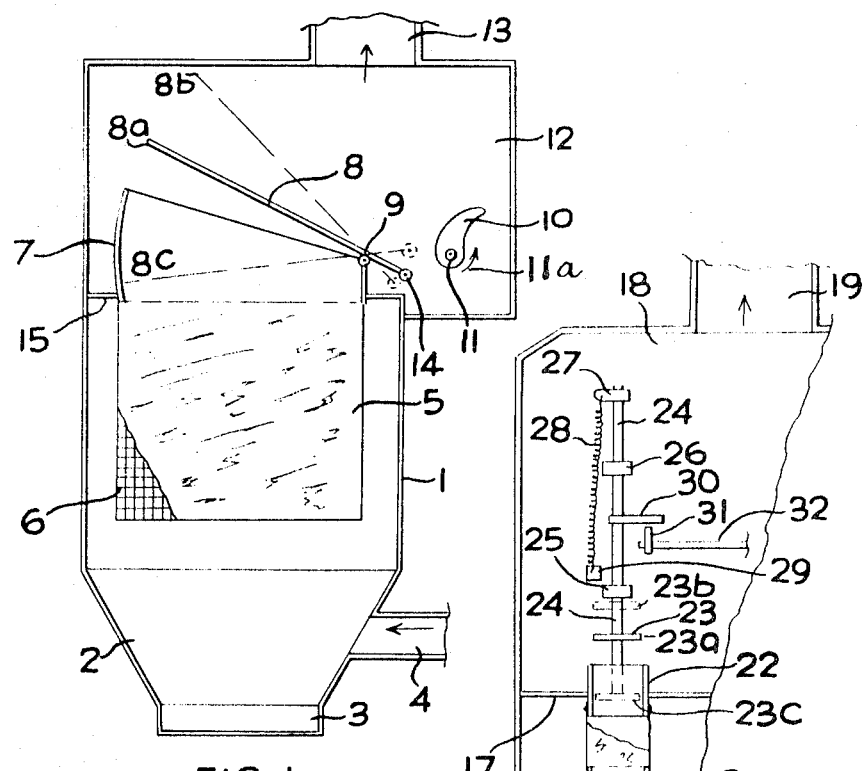

United States Patent

[11] 3,589,520

| [72] | Inventor | John Thorne<br>The White House, 4, Church Street,<br>Rothley, Leicestershire, England |
|---|---|---|
| [21] | Appl. No. | 773,984 |
| [22] | Filed | Nov. 7, 1968 |
| [45] | Patented | June 29, 1971 |
| [32] | Priority | Nov. 7, 1967 |
| [33] | | Great Britain |
| [31] | | 50658/67 |

[54] FILTERING APPARATUS
2 Claims, 2 Drawing Figs.

[52] U.S. Cl. .................................................. 210/333,
55/288, 55/293, 55/303
[51] Int. Cl. ................................................ B01d 46/04
[50] Field of Search .......................................... 55/288,
293, 302, 303; 210/333

[56] References Cited
UNITED STATES PATENTS

| 1,864,622 | 6/1932 | Sutherland .................. | 55/293 X |
| 2,276,805 | 3/1942 | Tolman, Jr. .................. | 55/288 |
| 2,368,787 | 2/1945 | Skinner ....................... | 55/302 X |
| 2,443,162 | 6/1948 | Hallock ....................... | 55/288 |
| 2,781,104 | 2/1957 | Fischer ........................ | 55/288 |
| 3,392,835 | 7/1968 | Asper .......................... | 210/333 X |
| 3,445,002 | 5/1969 | Muller ......................... | 210/333 X |

FOREIGN PATENTS

| 526,138 | 5/1931 | Germany ..................... | 55/288 |

*Primary Examiner*—John Adee
*Attorney*—Wolf, Greenfield and Sacks

ABSTRACT: Filtering apparatus having a filtering compartment and an upper discharge chamber and provided with means for effecting a rapid and short term pressurizing of the fluid to be filtered on the downstream side of the filtering means so that a short rapid reverse flow of fluid occurs through the filtering means to dislodge accumulation of filtrate. The filtrate may be discharged into a collecting bin below the filling compartment.

3,589,520

FILTERING APPARATUS

This invention is for improvements in filtering apparatus and is concerned with filters generally whether for use with gaseous or liquid media, such media being referred to herein generically as "fluid." One object of the invention is to provide for removal of collected filtrate from filter elements from time 60 time during the operation of filter apparatus and in a manner which is convenient, effective and economical.

In known methods of cleaning filters by removal of collection filtrate from the filtering elements practices adopted comprise the following. In one procedure the filter chamber is divided into compartments with valves and valve-control control means so arranged that each compartment is cleaned in turn by reverse flow of the fluid medium to be filtered whilst the other compartments are in use. In a second procedure a duct containing high-pressure fluid is moved across each filtering surface on the downstream side and directs a flow of fluid under high pressure through a narrow slot directed towards the filtering surface so as to cause a backflow through the latter thereby releasing collected filtrate progressively from the filtering surface. A third procedure is to induce by injection a reverse flow of a small volume of fluid at high velocity or a larger volume of fluid at moderate velocity through each filter or group of filters in turn belonging to an installation of a number of filters or a number of groups of filters. When such fluid is induced and particularly when it is induced at high velocity the surfaces of the filters are in turn cleaned almost instantaneously and this method is generally regarded as superior to the others because the reversal of flow is for only a short duration at each filter or group of filters and the cleaning involves placing each filter element out of commission (for cleaning purposes) for only a very small proportion of the total filtering period. Moreover the sudden action of fluid at high velocity produces a mechanical shock which assists in dislodging the filtrate. However at least the second and third procedures just referred to require the provision of a separate supply of cleaning fluid under pressure and this complicates the filtering plant and causes it to be more expensive, and the third procedure requires a somewhat complex timing means. The invention seeks to provide apparatus by which relatively efficient filtering with periodic cleaning of the filtering surfaces can be secured in a relatively simple manner at a reasonably low cost.

In accordance with the invention there is provided filtering apparatus having means for effecting a rapid and short term compression of the fluid on the downstream side of a filter or a group of filters so that a short rapid reverse flow of fluid occurs through the filtering surface or surfaces to dislodge any accumulation of filtrate thereon. By this provision cleaning of the filter or filters can be performed effectively and with a good overall efficiency and without the need for providing any additional source of compressed fluid.

In a convenient form of apparatus the discharge passageway or chamber from a filter or group of filters is fitted with a valve, piston or diaphragm which normally permits free flow of fluid through the filter or group of filters and out through a discharge passage for clean fluid, and which can be operated with a pumping action in such a way that rapid back flow of fluid through the filter or filters is caused to occur. The valve, piston or diaphragm just referred to may operate to create a back pressure of fluid in an individual filter element or in a group of filter elements by itself closing an outlet passage leading from the elements and setting up a back pressure therein. Alternatively the valve, piston or diaphragm may operate to create a pressure buildup in the fluid in a chamber to which the outlet or outlets of one or more filter elements are connected and by so doing close a pressure-operated valve at an outlet from said chamber so as to stop the flow of fluid through said outlet, and at the same time cause a reverse flow of the fluid through the filter element or elements.

In practicing the invention the valve, piston or diaphragm aforementioned may be acted on by a spring which in an inoperative rest position of the valve, piston or diaphragm is unstressed, the spring being arranged to be loaded by a preliminary cocking movement of the valve, piston or diaphragm and then released suddenly to impart a rapid movement to the valve, piston or diaphragm past its rest position through a stroke during at least part of which the valve, piston or diaphragm sets up the required back pressure in the fluid on the downstream side of the filter or group of filters.

The invention has a particularly useful application to filters for cleaning air or other gaseous medium in which case the filters are conveniently positioned over a dust-collecting bin which closes the bottom part of the filter casing and is removable for disposal of collected filtrate as and when required.

Certain convenient ways of practicing the invention are illustrated in the accompanying drawings, by way of example, as applied to air cleaning filters. In the drawings, FIG. 1 shows somewhat diagrammatically in central cross section one form of filter and filter-cleaning arrangement, FIG. 2 shows in similar diagrammatic form an alternative arrangement.

Figure 2:
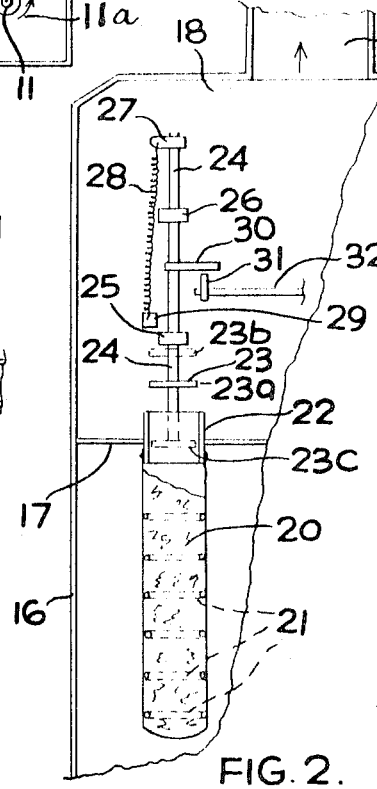

Referring to FIG. 1 the filtering apparatus comprises a body part 1 fitted at its lower part with a hopper 2 and a removable dust-collecting bin 3. The inlet for gaseous medium (for example air) to be cleaned is shown at 4 leading into the hopper 2. Depending from a partition 15 which separates the body 1 of the filtering apparatus from an upper chamber 12 there are one or a plurality of filter elements each in the form of a filter envelope 5 fitted around a wire mesh frame 6. At the top of each filter element and forming an outlet passage from it there is a sheet metal box 7 having an open top and having pivoted to it at 9 a vane 8 constituting a swinging piston and having an extension fitted with a cam follower 14 for example in the form of a roller. The vane 8 is counterbalanced and is acted on by a spring (not shown) which is in the unstressed condition when the vane 8 is in an inoperative rest position indicated at 8a. The follower 14 cooperates with a cam 10 on a cam shaft 11 which is rotated in the direction of the arrow 11a.

The chamber 12 has an outlet 13 for filtered medium and normally the medium passes through the filter envelope or envelopes 5 to separate particles of foreign matter from it and then passes through the chamber 12 and outlet 13 in a clean condition. The shaft 11 is rotated at a suitably slow speed to cause the cam 10 at appropriate times to engage the follower 14 and rock the vane 8 upwardly to a position shown in chain lines at 8b in which the spring is loaded. Thereupon the top of cam 10 moves past the follower 14 and releases it so that the spring acting on the vane 8 causes it to have a sudden and rapid return movement overshooting the rest position 8a and moving downwardly within the box 7 to a position indicated by chain lines at 8c. In moving downwardly into the box 7 the vane 8, which has a fairly close fit in the box, compresses the medium and forces a sudden reverse flow thereof through the filter envelope 5 whereupon the vane 8 returns to its rest position 8a. There is thus produced a rapid backflow of medium through the envelope 5 to remove filtrate therefrom partly by reverse flow action and partly by mechanical shock action causing the filtrate to drop down through the hopper 2 to the bin 3.

In a filtering unit having a group of filter elements 5,6 arranged in line the cam shaft 11 will have fitted to it at positions corresponding to the several vanes 8 of the several filter elements, cams corresponding to 10 angularly offset from one another in desired arrangement so that only one filter element is being cleaned at any instant.

In the construction shown in FIG. 2 the filter body is shown at 16 and a horizontal partition 17 separates it from an upper outlet chamber 18 having a delivery opening 19. Filter bags of round section, one of which is shown at 20, depend in a row from the partition 17 and are fitted with stiffening rings 21 and closed at the bottom ends. Each bag has its neck fitted on to the bottom of an upstanding cylinder 22 in which a piston 23 can slide. The latter is secured to the lower end of a piston rod 24 slidable in fixed bearings 25 and 26 and carrying a projection 27 at its upper end connected to one end of a tension spring 28 the other end of which is anchored to a fixed part 29. A further projection 30 on the piston rod cooperates with a rotary cam 31 (corresponding to the cam 10) on a cam shaft 32 which is rotated at a slow speed. The cam 31 periodically lifts the projection 30 and with it the piston valve 23 from a rest position indicated at 23a to a raised position 23b in which the spring 28 is stressed. The cam then suddenly releases the projection 30 and allows the spring 28 to move the piston rapidly downwards causing it to overshoot the rest position 23a, enter the cylinder and descent to a low position shown in chain lines at 23c afterwards returning immediately to the position 23a. The downward movement of the piston 23 in the cylinder 23 causes a sudden and short-lived reverse flow of fluid to clean the filter bag 20 by removal of dust or other filtrate from its exterior. The other filter bags in the row are similarly cleaned at different times in sequence by differently timed cams on the cam shaft 32 acting similarly on pistons corresponding to piston 23.

It will be evident from the examples given that the invention may be practiced in a number of different mechanical forms and that it is applicable to filtering systems operating under either positive or negative pressure, that is by positively propelled or suction-induced flow of medium through the filtering apparatus.

What I claim is:

1. In filtering apparatus for fluids, the combination comprising a filtering compartment having upstream and downstream chambers, a partition separating said chambers, filtering means mounted in said partition and interposed between the upstream and downstream chambers and comprising a plurality of filtering sections each including a filter element and outlet, pumping means to cause positive reverse flow of fluid through the filtering means and comprising a separate fluid pusher device for each filtering section, means mounting each pusher device for movement from a neutral setting outside the outlet of its related filtering section through an operative stroke into said outlet, means for operating said pusher devices periodically and in sequence with a rapid action to create sudden reversals of flow through the filtering sections whereby to dislodge accumulated filtrate, each pusher device being provided with spring means normally relaxed with the pusher device in its neutral setting and means for deflecting the pusher device against the action of the spring means to load the latter and then releasing said device to cause it to be moved by the spring means through a rapid operating stroke to reverse the fluid flow through the related filtering section.

2. A combination according to claim 1 comprising a cam shaft having cams thereon at differently timed settings for respectively operating the pusher devices to deflect them against the action of their spring means and then release them in sequence for the operative movements of the pusher devices.